United States Patent [19]

Yamada et al.

[11] 3,861,744

[45] Jan. 21, 1975

[54] SAFETY BELT

[75] Inventors: Hirokazu Yamada; Akihiro Sato, both of Osaka, Japan

[73] Assignee: Ashimori Kogyo Kabushiki Kaisha, Osaka-fu, Japan

[22] Filed: Apr. 5, 1973

[21] Appl. No.: 348,223

[30] Foreign Application Priority Data
Apr. 7, 1972 Japan.............................. 47-40881
Apr. 7, 1972 Japan.............................. 47-40967
Apr. 7, 1972 Japan.............................. 47-40968

[52] U.S. Cl........................... 297/386, 239/DIG. 1
[51] Int. Cl............................................. A62b 35/00
[58] Field of Search.................... 297/386, 385, 384; 139/DIG. 1; 244/122 R, 122 B; 280/150 SB

[56] References Cited
UNITED STATES PATENTS

| | | | |
|---|---|---|---|
| 2,474,124 | 6/1949 | Schultz........................ | 297/386 UX |
| 2,475,588 | 7/1949 | Bierman...................... | 297/386 UX |
| 2,823,046 | 2/1958 | Banta........................... | 297/386 X |
| 3,302,973 | 2/1967 | Ravau.......................... | 297/386 |
| 3,424,495 | 1/1969 | Cherup........................ | 297/386 |
| 3,561,819 | 2/1971 | Renneker..................... | 297/386 |

Primary Examiner—James T. McCall
Attorney, Agent, or Firm—William J. Daniel

[57] ABSTRACT

A safety belt having controlled elongation characteristics. The elongation capacity remains negligible under small tensile loads but increases sharply when the belt is stressed above a certain load level up to a predetermined extent of elongation after which further elongation is strongly resisted. Preferably, the belt exhibits a minimum tendency to recover from such elongation by contraction even after release of the tensile load.

2 Claims, 7 Drawing Figures

SAFETY BELT

BACKGROUND OF THE INVENTION

This invention relates to an improvement in a safety belt for association with the seats of automobiles or other transport vehicles. More particularly, this invention relates to a safety belt so constructed to exhibit a "hysteresis loop," i.e., a stress elongation curve, ideal to prevent the user from any injury when exposed to severe emergency stopping conditions.

In recent years, traffic accidents have significantly increased with the development of transport facilities, especially automobiles and the like vehicles. For protecting drivers and passengers from injury in the case of emergency, a number of protection devices have been designed and put into practice, such as safety belts and shock-absorbing bumpers. Among these devices, safety belts are most widely used because of their simplicity and low cost. Such safety belts are generally mounted adjacent the seat of a driver or passenger to hold his or her body fast to the seat. However, safety belts conventionally used as webbing or harness are not satisfactory for the purpose of preventing the users from any injury during emergencies. The "hysteresis loop," i.e., the stress-elongation curve, of a conventional belt of this type is similar to that depicted at A in FIG. 1. Such safety belts will exhibit only relatively small elongation even under relatively high tensile loads and, moreover, the belt will rapidly return to its virtually original length by contraction when released from the load. This type of safety belt, therefore, yields or stretches only to a small degree in absorbing the impact of a sudden stop and, moreover, tends to pull the wearer backward with a sharp jerk due to its contraction after the impact load has ceased and can in itself be a cause of injury.

Thus, much effort has been devoted by this art to overcoming these defective characteristics in conventional belts. Theoretically, an ideal belt presumably capable of avoiding these undesirable characteristics should exhibit a hysteresis loop, such as that shown at B in FIG. 1. For this ideal safety belt, the elongation capacity thereof is negligible while under relatively light initial loads, but increases rapidly when the load reaches a certain level (the maximum load which is below the level of adversely affecting the human body, i.e., 400 kg. to 500 kg. in general) to yieldably absorb the forward thrust of the wearer's body. When the belt elongation reaches a certain limit (i.e., short of the point at which the wearer's body would be subjected to a secondary impact against the windshield or dashboard of the automobile, which is usually 30–35 percent), further elongation is sharply resisted to prevent such a secondary impact. After elongation, the belt is virtually free of any tendency to contract back to its original length even after the belt is released from the load, thus preventing the wearer's body from being yanked sharply backward. Such a theoretically ideal safety belt has virtually no likelihood of causing injury; hence, there is a large demand for actual development of a safety belt having this ideal behavior.

BRIEF SUMMARY OF THE INVENTION

Accordingly, it is a prime object of this invention to provide a new type safety belt approximating this ideal hysteresis loop.

It is another object of this invention to provide a safety belt which is constructed over at least a portion of its length in such a way as to allow a small elongation percentage while under a small tensile load and a much higher elongation at higher loads with a negligible tendency to recovery when the tensile load is released.

These and other objects, features and advantages of this invention will become apparent as the description proceeds.

DETAILED DESCRIPTION OF THE INVENTION

In accordance with this invention, there is provided a safety belt characterized by a negligible elongation capacity at small tensile loads, a substantially increased capacity above a certain load level, and then a sharply reduced capacity after a certain degree of elongation is achieved, the belt being virtually free from contraction even when fully released from the tensile load.

It has been found that a hysteresis loop approximating the ideal can be achieved in one embodiment of belt by incorporating into the belt fabric along with the usual warp threads of natural or synthetic fibers or filaments, a group of additional warp threads which have a small elongation capacity under a small tensile load but are capable of undergoing sharp elongation with negligible recovery of elasticity, for example by rupturing, when the tensile load reaches a certain level. It has also been found that the hysteresis loop can similarly be controlled in other embodiments by providing an emergency expansion loop which is held together by a connection of controlled strength of any of several different forms.

This invention will now be described in more detail with reference to the accompanying drawings.

Figure 1:
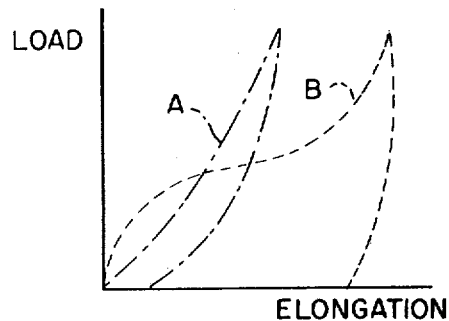
FIG. 1 is a graph comparing a "hysteresis loop," i.e., a stress-elongation curve, A exhibited by a conventional safety belt and a theoretical hysteresis loop B believed to be ideal for preventing injury.

In FIG. 1, the hysteresis loop A for a known conventional safety belt is seen in comparison with theoretical hysteresis loop B which is ideal for preventing injury to the wearer in case of emergency. It is apparent that in curve B any elongation once achieved is virtually permanent, i.e., is not recovered by contraction, when the belt is released from a tensile load, while elongation is reduced in curve A, the belt recovers to almost its original state released from tension load. In the case of an A-type belt, therefore, it is difficult to absorb the forward moving momentum of the user's body during a sudden stop.

Figure 2:
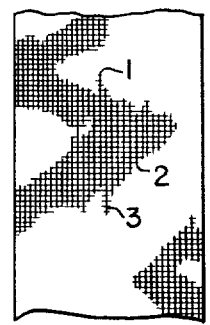
FIG. 2 is a partial plan view of a safety belt according to one embodiment of this invention.

In FIG. 2, a safety belt according to one embodiment of this invention is constructed of a woven fabric, using as the warp 1 strands thereof a mixture of threads of a fiber which elongates little or not at all up to a certain breaking or rupture point, for instance, glass or metal fibers, and threads of a conventional natural or synthetic fiber.

Figure 3:
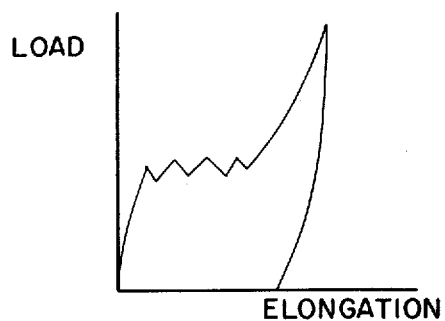
FIG. 3 is a graph of a hysteresis loop for the belt embodiment of FIG. 2.

When a load is applied on the belt made of such mixture of threads, the belt remains almost unelongated at initial loads by virtue of the tensile strength of the threads 2 of negligible elongation capacity employed in the warp 1 of the fabric body of the belt. However, when the load reaches a certain level, the threads 2 break or rupture one after another and the body of the belt elongates gradually. After the threads 2 are all ruptured, the elongation capacity of the belt is determined in conformity with the hysteresis loop of the threads 3 made of conventional natural or synthetic fibers, whereby a composite stress-strain curve is exhibited as shown in FIG. 3 which is quite approximate to the ideal hysteresis loop B in FIG. 1.

Figure 4:
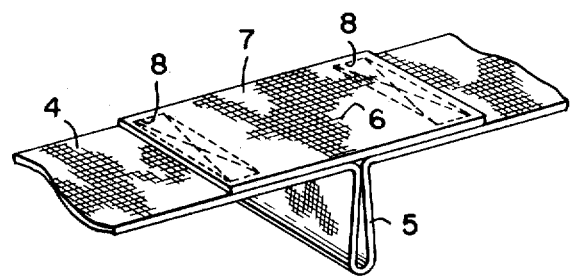
FIG. 4 is an oblique perspective view of a belt according to another embodiment of this invention.

In FIG. 4, a belt according to another embodiment of this invention is formed at one or more points along its length with an expansion loop or bight 5 of the desired length, the legs or ends of such loop being held together by a length of connecting fabric 7 made of unelongated i.e. undrawn threads using at least as the warp 6 known synthetic threads which undergo substantial elongation with negligible recovery of elasticity when stressed in tension above a certain level of load. The connecting fabric is arranged on the upper surface of the body of belt 4 with the end margins 8,8 thereof being attached to the belt body to thus form the expansion loop 5.

Figure 5:
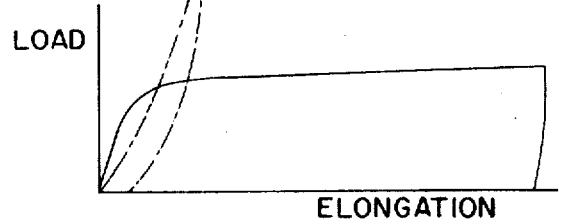
FIG. 5 is a graph of a hysteresis loop for the connecting length of fabric used in the safety belt of FIG. 4.

The fabric 7 made of unelongated or undrawn threads has a hysteresis loop similar to that shown in FIG. 5 and permits extreme elongation usually to 500 to 600 percent, when the tensile load reaches a certain value. In this case, the load remains almost unchanged in the course of elongation. Even in case the fabric is released from the tensile load in the course of elongation, the elongated condition is maintained intact without showing recovery of elasticity. With the safety belt thus constituted, the body of belt 4 and the connecting fabric 7 made of unelongated or undrawn warp threads 6 only slightly change in elongation so long as the load is light, similar to the belt of FIG. 2. When the load reaches a certain level, however, the fabric 7 is subjected to sharp elongation. When the length of the expansion loop 5 is reached when the connecting fabric 7 is elongated to a certain point, the fabric 7 no longer alone bears the load. Rather, the total tensile load is then applied directly to the body of belt 4 and the load bearing capacity of the belt increases in conformity with the hysteresis curve of the body of belt 4. The fabric is accompanied with no significant recovery of elasticity even after the body of belt is released from the load, thus resulting in a composite hysteresis loop such as the curve shown in FIG. 3 which approximates the virtual ideal hysteresis loop B in FIG. 1.

Figure 6:
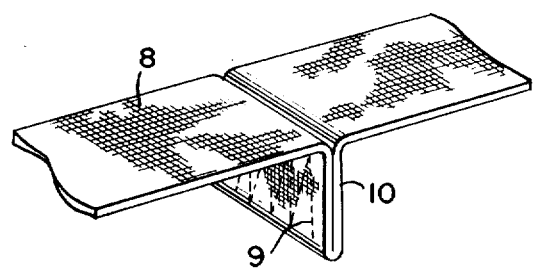
FIG. 6 is an oblique perspective view of a belt according to still another embodiment of this invention.

FIG. 6 shows a safety belt similar to that illustrated in FIG. 4 in that the belt body 8 is provided in at least one point thereon with an expansion loop 10. Here, however, loop 10 is held together by a connecting material 9 which can be in the form of stitching which is adapted to separate or break apart, or of a bonding agent or adhesive which pulls free or breaks apart, in either case when the tensile load reaches a certain level.

Figure 7:
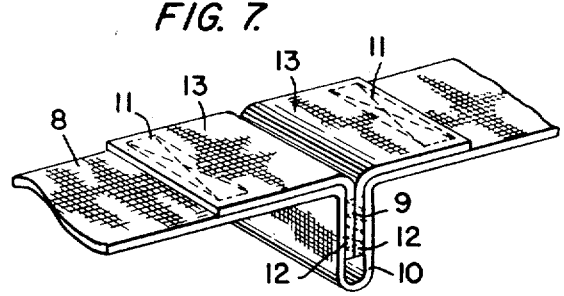
FIG. 7 is a similar view of a variant of the embodiment of FIG. 6.

The expansion loop 10 may be formed by either taking a slackened length of the body of the belt and directly stitching or bonding this section by the aid of the connecting material 9 in the manner shown in FIG. 6, or, alternatively, by attaching separate end sections 11,11 on the surface of the body of belt 8, respectively, and by joining the contacting faces 12,12 of these end sections with each other by means of the connecting material 9 in such a manner as shown in FIG. 7.

For a safety belt constructed as in FIGS. 6 and 7, when tension is applied in the course of use, the belt 8 body including the expansion loop 10 remains unelongated while the tensile load is still negligible. However, when the tensile load reaches a certain level, either the connecting threads constituting the connecting material 9 for the loop 10 are ruptured or the bonding agent comes off gradually. Thus, the length of the belt body 8 is increased to a degree equal to the length of the loop 10 until the safety belt is fully elongated, whereby the impact momentum of the body of a user of the safety belt is absorbed. When the safety belt is elongated to the maximum length of the expansion loop 10, the total tensile load is applied to the body of belt 8 which is constructed with sufficient strength to bear that load. Obviously, there can be no substantial recovery of elasticity even after the safety belt is released from the tensile load; hence, the belt has a hysteresis curve similar to the ideal hysteresis loop given above.

In any type of safety belt according to this invention, the elongation capacity remains small while the initial tensile load is light, then increased sharply when the tensile load reaches a certain level until a given amount of elongation occurs, after which further elongation is strongly resisted. Once elongated, the safety belt is virtually free from contraction even when fully released from the tensile load. In the use of the safety belt of this invention, therefore, there is no fear of having the wearer's body tightly restrained during the initial stages of sudden deceleration in the course of driving a vehicle. Rather, when the tensile load reaches a certain level, the safety belt is elongated automatically to absorb securely enough such impact energy as is to be applied on the wearer's body, while at the same time preventing the wearer from experiencing any secondary impact. It is also possible to effectively remove the hazard of rapidly jerking the wearer's body backward with possible injury, since the instant safety belts are virtually free from contraction even after release from tension. Consequently, the safety belt of this invention is superior in these respects to conventional safety belts and are well suited for practical use in various types of transportation vehicles.

What is claimed is:

1. In a safety belt for an automotive vehicle and the like wherein a portion of the body of an occupant is encircled by an elongated belt body of substantially nonextensible material having its ends anchored to the vehicle frame to restrain and protect such occupant in the event of a primary impact upon said vehicle, the improvement comprising an expanshion loop or bight formed in such belt body at at least one point between its ends, such expansion loop or bight being of a length to provide upon release thereof limited extension of the belt body up to about 35 percent but short of a length permitting secondary impact of the encircled portion of said occupant against an adjacent part of the vehicle, and yieldable connecting means extending between the loop ends to hold such ends together and constituted essentially of substantially non-elastic undrawn synthetic strands having a capacity to undergo substantial elongation with negligible recovery of elasticity when stressed above a predetermined load below the breaking load thereof and thereby permit release of said loop.

2. The belt of claim 1 wherein said yieldable connecting means comprises a length of fabric having the warp threads thereof formed of said synthetic strands and extending between said loop ends.

* * * * *